United States Patent [19]
Boyer et al.

[11] Patent Number: 5,257,552
[45] Date of Patent: * Nov. 2, 1993

[54] HANDLEBARS FOR BICYCLES, MOTORCYCLES, ALL TERRAIN BIKES, ALL TERRAIN VEHICLES AND JET SKIS

[75] Inventors: Scott M. Boyer, Valencia; Charles R. Teixiera, IV, Canyon Country, both of Calif.

[73] Assignee: Answer Products, Inc., Valencia, Calif.

[*] Notice: The portion of the term of this patent subsequent to Jun. 2, 2009 has been disclaimed.

[21] Appl. No.: 833,125

[22] Filed: Feb. 10, 1992

[51] Int. Cl.⁵ .............................................. B62K 21/12
[52] U.S. Cl. ................................... 74/551.1; D12/178
[58] Field of Search ................. 74/551.1, 551.4, 551.5, 74/551.6; D12/178

[56] References Cited

U.S. PATENT DOCUMENTS

| | | | |
|---|---|---|---|
| D. 30,821 | 5/1899 | Scandrett | D12/178 |
| D. 101,953 | 11/1936 | Henry | D12/178 |
| D. 301,027 | 5/1989 | Borromeo | D12/178 |
| 610,328 | 9/1898 | Martin | 74/551.1 |
| 822,487 | 6/1906 | Smith | 74/551.1 |
| 2,004,089 | 6/1935 | Anderson | 74/551.1 |
| 4,635,499 | 1/1987 | McMurtrey | 74/551.1 |
| 4,903,542 | 2/1990 | Borromeo | 74/551.1 |
| 5,117,708 | 6/1992 | Boyer et al. | 74/551.1 |

*Primary Examiner*—Richard M. Lorence
*Assistant Examiner*—Benjamin Levi
*Attorney, Agent, or Firm*—Thomas I. Rozsa; Dong Chen

[57] ABSTRACT

Improved handlebars for bicycles, motorcycles, power vehicles such as two wheeled power vehicles and all terrain vehicles, including off road bicycles, motorcycles, dirt bikes, all terrain bicycles, all terrain vehicles and jet skis. The improved handlebars eliminate the need of a crossbar by increasing the diameter and sidewall thickness of the central section of the handlebars, and diminish the stiffness of the handlebars by decreasing the respective diameter and sidewall thickness of the two grip sections of the handlebars. The improved handlebars are incorporated with unique tapered sections and are manufactured through a process that causes greater amount of metal to be located in the widest diameter section of the handlebars, and smaller amount of metal to be located in the narrowest diameter section of the handlebars. The handlebars have a longer unsupported span than conventional handlebars, thereby providing more cushioning strength and greater steering control. The strength of the handlebar is reinforced due to the increased diameter and thickened sidewall of said central section, and the stiffness of said handlebar is reduced due to the decreased diameters and thinned sidewalls of said first and second grip sections.

24 Claims, 3 Drawing Sheets

HANDLEBARS FOR BICYCLES, MOTORCYCLES, ALL TERRAIN BIKES, ALL TERRAIN VEHICLES AND JET SKIS

BACKGROUND OF THE INVENTION

1. Field of the Invention

The present invention relates to the field of handlebars for bicycles, motorcycles, power vehicles such as two wheeled power vehicles and all terrain vehicles. More particularly, the present invention relates to the field of improvement of handlebars specially designed and constructed for off road bicycles, motorcycles, dirt bikes, all terrain bicycles, all terrain vehicles and jet skis.

2. Description of the Prior Art

The following prior art references were found to be relevant to the present invention.

1. U.S. Pat. No. 4,903,542 issued to Borromeo on Feb. 27, 1990 for "Bicycle Handlebar Assembly, Particularly For Sports Bicycles" (hereafter the "Borromeo Patent").

2. U.S. Pat. No. 4,635,499 issued to McMurtrey on Jan. 13, 1987 for "Bicycle Handlebar Brace" (hereafter the "McMurtrey Patent").

3. U.S. Pat. No. 2,004,089 issued to Anderson on Jun. 11, 1935 for "Handle Bar" (hereafter the "Anderson Patent").

4. U.S. Pat. No. 822,487 issued to Smith on Jun. 5, 1906 for "Reinforcing Tube" (hereafter the "Smith Patent").

5. U.S. Pat. No. 610,328 issued to Martin on Sep. 6, 1898 for "Handle Bar" (hereafter the "Martin Patent").

6. U.S. Pat. No. Des. D301,027 issued to Borromeo on May 9, 1989 for "Handlebar, Especially For Racing Bicycle" (hereafter the "Borromeo Design Patent").

7. U.S. Pat. No. Des. D101,953 issued to Henry on Nov. 17, 1936 for "Handlebar" (hereafter the "Henry Design Patent").

8. U.S. Pat. No. Des. D30,821 issued to Scandrett on May 16, 1899 for "Bicycle Handle Bar" (hereafter the "Scandrett Design Patent").

The Scandrett Design Patent discloses bicycle handlebar having a widened center section and trimmed grip sections. The diameter of the handlebar is gradually changed from its center to its two ends. The whole handlebar is curved without any straight section.

The Henry Design Patent discloses a bicycle handlebar having a hollow construction. The widened center section has hexagonal cross-section and the two grip sections have modified hexagonal cross-sections. The thickness of the sidewall of the center section is the same as the thickness of the respective sidewalls of the two grip sections.

The Borromeo Design Patent discloses an ornamental design for a handlebar. The two "L"-shaped grip sections are generally perpendicular to the broadened center section.

The Martin Patent discloses a horn-shaped handlebar. The outer ends of the two opposite halves 1 of the handlebar are reinforced by ferrules or caps 2 by small mounting screws 9, and the inner ends of the two opposite halves 1 of the handlebar are mounted to a wooden coupling or insert 3 by small mounting screws 4.

The Smith Patent discloses a bicycle handlebar having a hollow construction. The center section of the elongated hollow tube is reinforced by a short inner hollow tube, which is inserted within the elongated outer tube.

The Anderson Patent discloses a bird-shaped handlebar constructed with a single piece of sheet metal which is extremely streamlined. The handlebar serves as a housing of a headlight and two park lights.

The McMurtrey Patent discloses a bicycle handlebar 10 which represent a popular type of conventional handlebar currently on the market. The handlebar 10 has a center section 16 having a knurled portion 18, two bent sections 20 and 22, and two grip sections 24 and 26. The diameter of the handlebar is uniform. The construction of the heightened and tilted grip sections 24 and 26 and the bowed bent section 20 and 22 provides comfortable handling for a rider. However, it reduces the strength of the handlebar 10. To solve this problem, the McMurtrey Patent utilizes a crossbar or brace 28 to reinforce the handlebar 10. The crossbar or brace 28 is attached between the two bent sections 20 and 22 and is generally parallel to the center section 16 to increase the strength of the handlebar 10.

The Borromeo Patent discloses a bicycle handlebar assembly for assembling certain auxiliary elements such as brake-lever C onto a handlebar. The assembly includes an "L"-shaped column or support B and tubular chips D. The handlebar has two typical "U"-shaped grip sections generally perpendicular to the center section of the handlebar.

The bicycle handlebar disclosed in the McMurtrey Patent represents a popular type of conventional bicycle handlebar currently available on the market. Shown in FIG. 1, such a conventional handlebar 1 typically has a center section 3, two bent sections 5 and two grip sections 7. The diameter of the prior art handlebar 1 is uniform throughout its entire lengthwise dimension. In general, the preferred diameter of the conventional handlebar 1 is $\frac{7}{8}$ inch because this provides its grip sections 7 with the proper amount of thickness so that a handle member preferably made of polyvinyl or rubber and having a thickness of approximately $\frac{1}{8}$ to $\frac{1}{4}$ inch can be fitted over a portion of each grip section. However, while the thickness of approximately $\frac{7}{8}$ inch for the diameter provides an ideal thickness to facilitate the gripping member or handle at either end, it leaves a relatively thin center section 1 and bent sections 3, which are often not strong enough for absorbing the stresses, strains and shocks imparted to the conventional handlebar 1 from off road or dirt bike riding. In order to strengthen the conventional handlebar 1, the crossbar or brace 9 is introduced.

Figure 1:
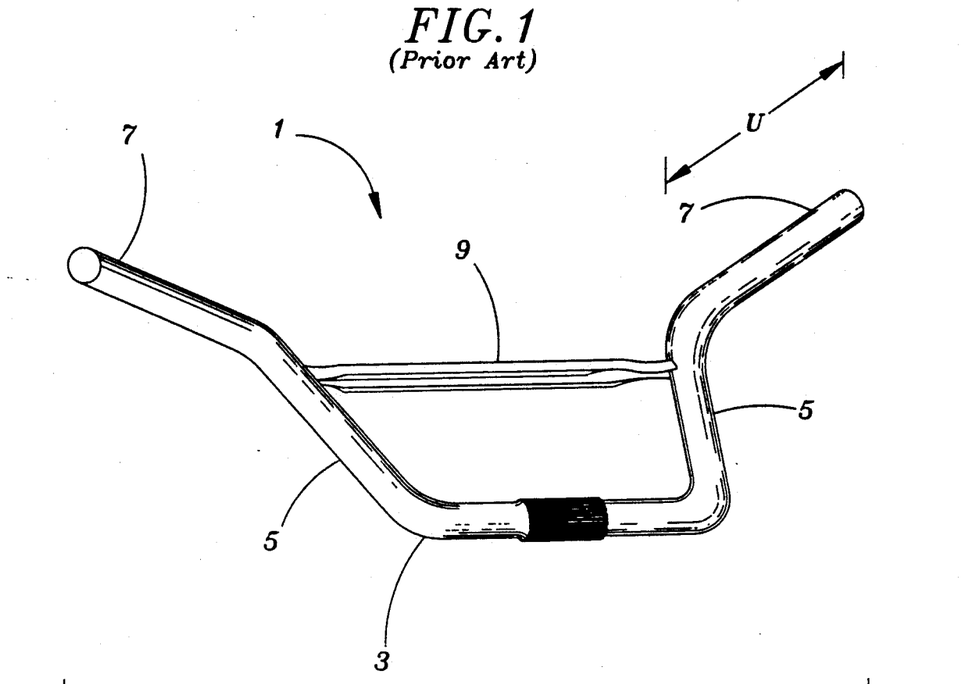
FIG. 1 is a perspective view of a prior art handlebar 1, showing that a crossbar or brace 9 is attached at the respective joints between the bent sections 5 and the grip section 7 and parallel to the center section 3 to increase the strength of the conventional handlebar 1.

In operation, the conventional handlebar 1 is attached to the motorcycle, dirt bike, all terrain vehicle or jet ski along the length of the center section 3, such that the crossbar or brace 9 is facing the rider on the off road motorcycle, dirt bike or other vehicle. The $\frac{7}{8}$ inch center section 3 is usually not of sufficient strength to withstand the impact of heavy loads, and the purpose of the crossbar or brace 9 is to prevent the conventional handlebar 1 from buckling if the off road motorcycle or dirt bike should bump into something or crash to the ground. The crossbar or brace 9 and attachment to the bent sections 5 causes a permanent compression set to occur in the bent sections 5 in the event of an impact. However, the crossbar or brace 9 provides no added benefit when steering the off road motorcycle or dirt bike. In fact, the crossbar or brace 9 reinforces the conventional handlebar 1 in only the vertical direction but not the horizontal direction.

Therefore, the major disadvantage of prior art handlebars is that they require a crossbar or brace for adding strength. However, because the crossbar or brace provides rigid support at its attachment points to the bent sections, it forces stress concentrations there, which tends to take a permanent set in falls. In addition, the crossbar or brace constrains any movement that would soften shock loads to the grip sections which are placed over the ends of the handlebars.

Therefore, there is a significant need for an improved configuration for handlebars which provides greater strength, improved shock absorption, and improved steering capability.

SUMMARY OF THE PRESENT INVENTION

The present invention is improved handlebars for two wheeled vehicles, primarily for off road motorcycles and dirt bikes, and also for all terrain vehicles and jet skis. The improved design eliminates the requirement for a crossbar by designing handlebars that have a larger diameter center section including the area where the handlebars are attached to the vehicle, and a unique tapered configuration wherein the metal of the handlebars is manufactured through a process that causes a greater amount of metal to be located in the widest diameter section, the center section, of a handlebar, and a smaller amount in the narrowest diameter sections, namely the grip sections of the handlebar. The handlebar has grip sections wherein the unsupported span is longer than conventional handlebars, thereby providing more cushioning strength and greater steering control.

It has been discovered, according to the present invention, that the maximum amount of stress on a handlebar is at the point of attachment of the handlebar to the vehicle such as an off road motorcycle or dirt bike. The stresses are maximized at the maximum leverage point which is at the location of the attachment of the handlebar to the vehicle. Substantial stresses also occur at the points of attachment of the crossbar to the bent section of the handlebar. It has therefore been discovered that if the crossbar is eliminated, then a significant cause of stress at its attachment points is also eliminated.

It has further been discovered, according to the present invention, that if two hollow cylindrical objects are made of the same material but one has a larger diameter, then the strength of the cylinder with the large diameter and thicker sidewall is substantially greater. Therefore it has been discovered, according to the present invention, that if the diameter and the sidewall thickness of the center section of a handlebar is substantially increased, then the strength of the handlebar is substantially increased, the handlebar can better withstand stresses, and the need for a crossbar to add strength is eliminated. It has additionally been discovered that if the clamping surface at the attachment location is increased by 29% over prior art clamping surface area, then the result is a 48% more positive clamping bite.

It has also been discovered, according to the present invention, that the longer the grip section length is, the more cushioning the rider receives and the less impact to the rider's hands when a force is impacted on the motorcycle. Therefore, handlebars with bigger diameters and longer grip sections between the attachment points to the vehicle and grips provide more steering control and greater cushioning of the impact from bumps and other forces generated as the vehicle goes over dirt roads and other off road obstacles.

It has additionally been discovered, according to the present invention, that if the grip sections of the handlebars are tapered and bent by an appropriate amount, the configuration causes the grip sections of the handlebars to bend like a flagpole or aircraft wing assembly and distribute the stress and load evenly along the length of the handlebar between the attachment locations and the grips.

It is therefore an object of the present invention to provide an improved design for handlebars which provides increased strength at the locations where the handlebars are attached to the vehicle and eliminates the necessity of a crossbar or brace.

It is therefore an object of the present invention to provide an improved design for handlebars which have greater diameter and thicker sidewall in their center sections to increase the strength of the improved handlebars, which also have tapered diameter and tapered sidewalls in their bent sections, and which further have smaller diameter and thinner sidewalls in their grip sections to reduce the overall weight and the vertical stiffness of the improved handlebars.

It is a further object of the present invention to provide an improved design for handlebars which evenly distributes the impact load along the length of the handlebars between the attachment points and the grip members on the ends of the handlebars.

It is an additional object of the present invention to provide handlebars which enable the rider to have increased and effective steering control of the off road motorcycle or dirt bike.

It is also an object of the present invention to achieve a more uniform distribution of strain over the handlebars by eliminating the crossbar and adjusting both the diameter and wall thickness to match the structural needs at every point on the handlebars.

It is another object of the present invention to provide handlebars which have higher impact absorption in falls because energy is distributed more evenly.

It is an additional object of the present invention to provide handlebars having reduced stiffness in the vertical direction, thereby more effectively dissipating shock loads from the vehicle.

It is a further object of the present invention to provide handlebars having increased strength in the horizontal direction, adding better steering control.

It is another object of the present invention to provide shock attenuation through elimination of the crossbar or brace for handlebars. Shocks being transferred to the rider are significantly reduced, allowing more aggressive riding with more control and less rider fatigue.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is a perspective view of the present invention improved handlebar 2, showing that:

(a) the present invention improved handlebar 2 is a unitary piece having a strength-reinforced center section 10, two mirror-imaged bent sections 30 and 50, and two mirror-imaged stiffness-reduced grip sections 70 and 90, which are all integrally constructed;

(b) Width W is the distance between the distal end 76 of the first grip section 70 and the distal end 96 of the second grip section 90; and (c) Width M is the distance between the first end 14 and the second end 16 of the center section 10.

FIG. 3 is a perspective view of the present invention improved handlebar 2 when it is observed in a three-dimensional Cartesian Coordinate System XYZ (the XYZ-System), showing that:

(a) Plane I is the plane defined by the axis 78 of the first grip section 70 and the axis 98 of the second grip section 90;

(b) Plane II is the plane defined by the axis 38 of the first taped section 30 and the axis 78 of the first grip section 70;

(c) Plane III is the plane defined by the axis 18 of the center section 10, the axis 38 of the first bent section 30 and the axis 58 of the second bent sections 50;

(d) Angle A is the angle between the axis 18 of the center section 10 and the axis 38 of the first bent section 30;

(e) Angle B is the angle between the axis 18 of the center section 10 and Plane II;

(f) Angle C is the angle between the axis 38 of the first bent section 30 and the axis 78 of the first grip section 70;

(g) the axis 18 of the center section 10 is parallel to but not coincident with Plane I; and (h) Raise R is the distance between the axis 18 of the center section 10 and Plane I.

FIG. 6 is an end view of the present invention improved handlebar 2 when it is observed from the direction of the X-Axis of the XYZ-System, showing that:

(a) again Raise R is the distance between the axis 18 of the center section 10 and Plane II; and (b) Sweep S is the distance from the distal end 76 of the first grip section 70 to Plane III.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 2:
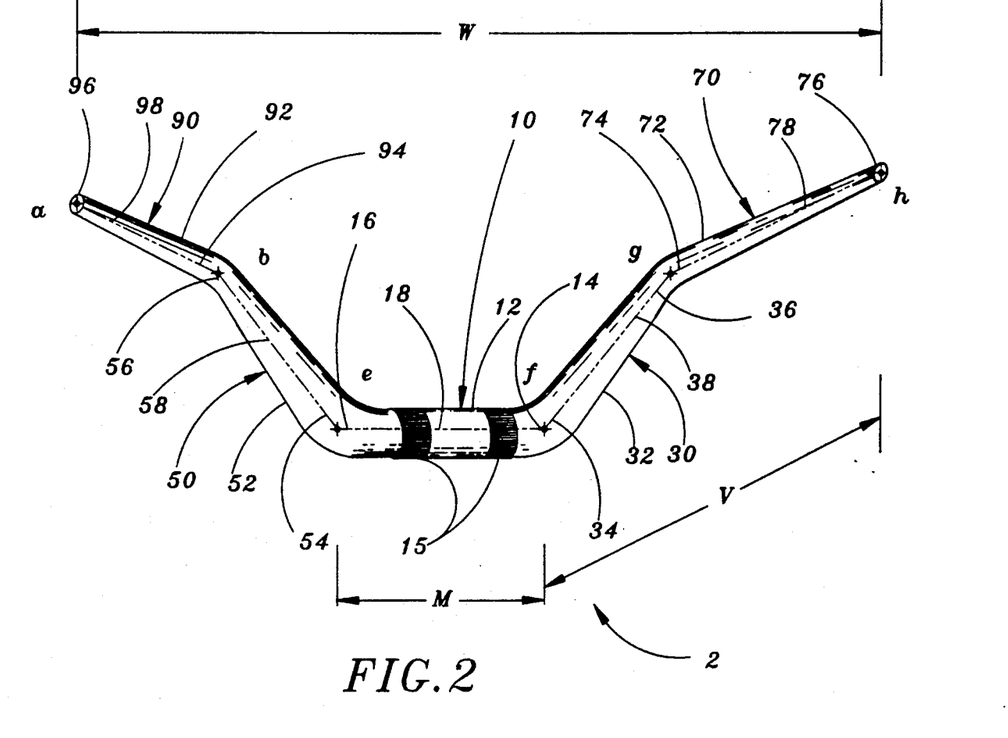
Figure 3:
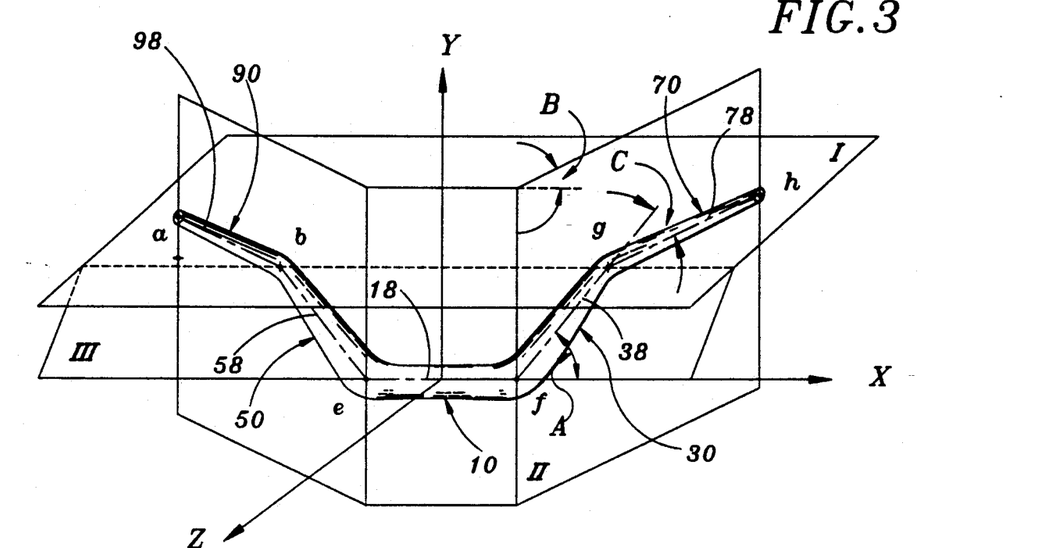

Referring particularly to FIG. 2, there is illustrated at 2 the perspective view of the present invention improved handlebar for a vehicle such as an off road motorcycle, dirt bike or all terrain vehicle, or for other vehicles such as a jet ski. A critical feature of one embodiment of the present invention improved handlebar 2 is the creation of the wider and thicker center section and tapered bent sections of the handlebars. The improved handlebar 2 is a unitary hollow tubular member having a straight center section 10, a first bent section 30, a second bent section 50, a first straight grip section 70 and a second straight grip section 90. All sections are integrally formed.

Each of the sections of the improved handle 2 is a hollow tubular segment having a principal axis, a cylindrical hollow sidewall and two opposite ends. The center section 10 has a cylindrical hollow sidewall 12, a first end 14, a second end 16 and a principal axis 18. The first bent section 30 has a tapered hollow sidewall 32, a proximal end 34, a distal end 36 and a principal axis 38, and the second bent section 50 has a tapered hollow sidewall 52, a proximal end 54, a distal end 56 and a principal axis 58. The first grip section 70 has a cylindrical hollow sidewall 72, a proximal end 74, a distal end 76 and a principal axis 78, and the second grip section 90 has a cylindrical hollow sidewall 92, a proximal end 94, a distal end 96 and a principal axis 98.

The first bent section 30 is integrally formed with and extending from the first end 14 of the center section 10, where the proximal end 34 of the first bent section 30 joins the first end 14 of the center section 10. The second bent section 50 is integrally formed with and extends from the second end 16 of the center section 10, where the proximal end 54 of the second bent section 50 joins the second end 16 of the center section 10. The first grip section 70 is integrally formed with and extends from the distal end 36 of the first bent section 30, where the proximal end 74 of the first grip section 70 joins the distal end 36 of the first bent section 30. Finally, the second grip section 70 is integrally formed with and extends from the distal end 56 of the second bent section 50, where the proximal end 94 of the second grip section 90 joins the distal end 56 of the second grip section 50.

The width W of the improved handlebar 2 is defined by the distance between the distal end 76 of the first grip section 70 and the distal end 96 of the second grip section 90. The middle width M of the improved handlebar 2 is defined by the distance between the first end 14 and the second end 16 of the center section 10. In the preferred embodiments of the present invention handlebar 2, the width W is approximately 32 inches, and the middle width M is approximately 7¼ inches.

Along the elongated hollow tubular body of the improved handlebar 2, several key points have been denoted for future references. The distal end 96 of the second grip section 90 is denoted as a. The joint of the proximal end 94 of the second grip section 90 and the distal end 56 of the second bent section 50 is denoted as b. The joint of the proximal end 54 of the second bent section 50 and the second end 16 of the center section 10 is denoted as e. The joint of the first end 14 of the center section 10 and the proximal end 34 of the first bent section 30 is denoted as f. The joint of the distal end 36 of the first bent section 30 and the proximal end 74 of the first grip section 70 is denoted as g. Last, the distal end 76 of the first grip section 70 is denoted as h.

It is appreciated that the second bent section 50 is a mirror-image of the first bent section 30, and the second grip section 90 is a mirror-image of the first grip section 90. Since the left half of the improved handle 2 is an exact mirror-image of the right half of the improved handle 2, only the right half will be introduced in detail in the following disclosure, unless otherwise explicitly indicated.

It is also appreciated that the spatial arrangement and relationship of the five integral sections of the present invention improved handlebar 2 is described in a three dimensional Cartesian Coordinate System XYZ (the XYZ-system), as shown in FIG. 2. The X-axis of the XYZ-system is closen to be coincident with the principal axis 18 of the center section 10. The Z-axis of the XYZ-system is chosen to be a symmetrical axis of the improved handlebar 2.

The choice of the Y-axis of the XYZ-system is somewhat arbitrary. However, since one of the significant features of the present invention improved handlebar 2 is that the axis 18 of the central section 10 is parallel to but not coincident with a plane defined by the axis 78 of the first grip section 70 and the axis 98 of the second grip section 90, the Y-axis is chosen to be perpendicular to that plane. This orientation of the Y-axis makes the ZX-plane of the XYZ-system parallel to that plane.

Shown in FIG. 2, the above mentioned plane defined by the axis 78 of the first grip section 70 and the axis 98 of the second grip section 90 is the first plane denoted as plane I. In the XYZ-system, Plane I is a horizontal plane positioned above the ZX-plane. It is clearly shown that axis 18 of the central section 10 is parallel to but not coincident with plane I.

Two other planes are also defined. The second plane defined by the axis 38 of the first bent section 30 and the axis 78 of the first grip section 70 is denoted as plane II. Plane II is a vertical plane. The third plane defined by the axis 18 of the center section 10, the axis 38 of the first bent section 30 and the axis 58 of the second bent section 50 is denoted as plane III. Plane III is an inclined plane intersecting the X-axis.

In addition, three angles are introduced here to describe the spatial arrangement and relationship of the five integral sections of the present invention improved handlebar 2. Defined in plane III, the angle between the axis 18 of the center section 10 and the axis 38 of the first bent section 30 is angle A. Defined in plane I, the angle between the axis 18 of the center section 10 and plane II is angle B. Defined in plane II, the angle between the axis 38 of the first bent section 30 and the axis 78 of the first grip section 70 is angle C.

In the preferred embodiments of the present invention handlebar 2, the angle A is between approximately 22 degrees and approximately 70 degrees, the angle B is between approximately 10 degrees and approximately 25 degrees, and the angle C is between approximately 7 degrees and approximately 80 degrees.

Furthermore, the sweep S of the improved handlebar 2 is defined by the distance from the distal end 76 of the first grip section 70 to plane III, and the raise R of the improved handlebar 2 is defined by the distance between the axis 18 of the center section 10 and plane I. In the preferred embodiments of the present invention handlebar 2, the sweep S is between approximately 3¼ inches to approximately 3⅝ inches, and the raise R is between approximately 2⅛ inches to approximately 3⅝ inches.

As an optional feature, the surface of the center section 10 may have knurlings 15 at two spaced apart locations, shown in FIG. 2, where the improved handlebar 2 is to be attached to a vehicle.

The following figures further illustrate the spatial arrangement and relationship of the five sections of the present invention improved handlebar 2.

Figure 4:
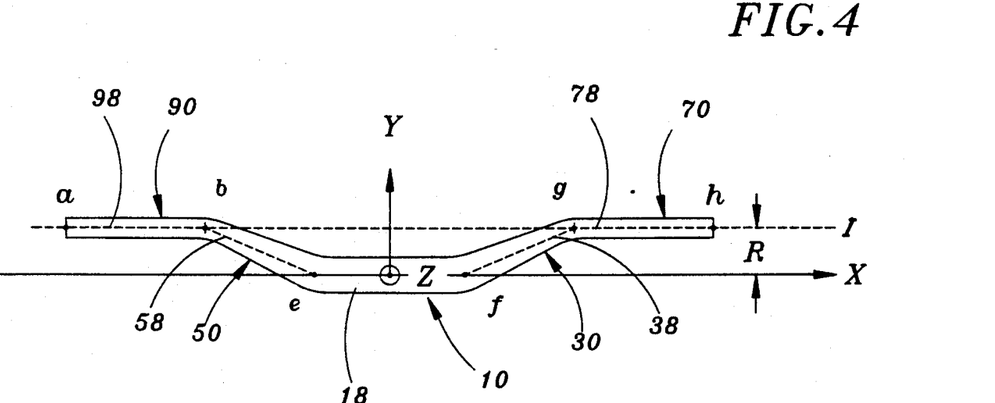
FIG. 4 is a front view of the present invention improved handlebar 2 when it is observed from the direction of the Z-Axis of the XYZ-System, showing again that Raise R is the distance between the axis 18 of the center section 10 and Plane I.

A front view of the improved handlebar 2 is shown in FIG. 4. It is viewed from the direction of the Z-axis of the XYZ-system, showing again that raise R is the distance between the axis 18 of the center section 10 and plane I.

Figure 5:
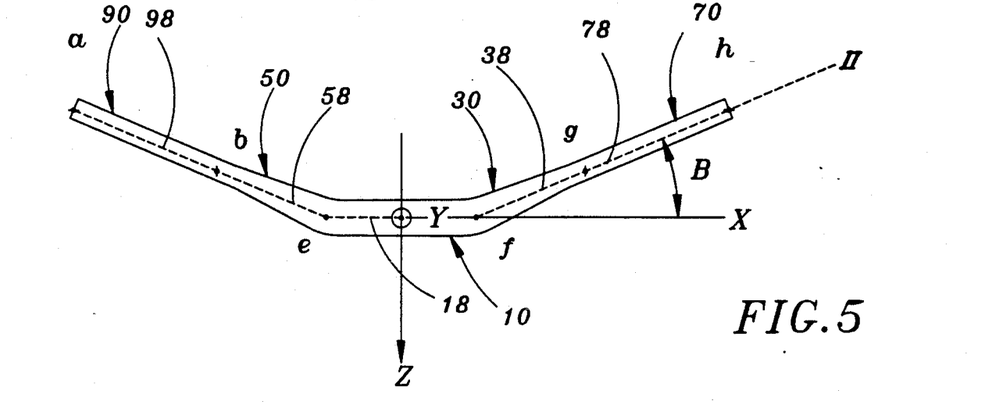
FIG. 5 is a top view of the present invention improved handlebar 2 when it is observed from the direction of the Y-Axis of the XYZ-System, showing again that Angle B is the angle between the axis 18 of the center section 10 and Plane II.

A top view of the improved handlebar 2 is shown in FIG. 5. It is viewed from the direction of the Y-axis of the XYZ-system, showing again that angle B is the angle between the axis 18 of the center section 10 and plane II.

Figure 6:
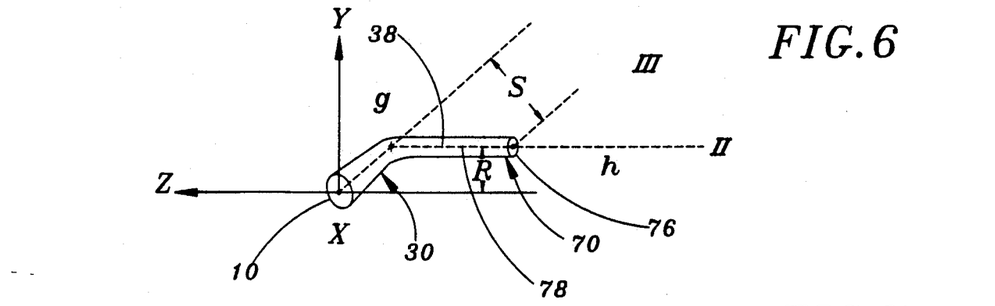

An end view of the improved handlebar 2 is shown in FIG. 6. It is viewed from the direction of the X-axis of the XYZ-system, showing again that raise R is the distance between the axis 18 of the center section 10 and plane II; and sweep S is the distance from the distal end 76 of the first grip section 70 to plane III.

Figure 7:
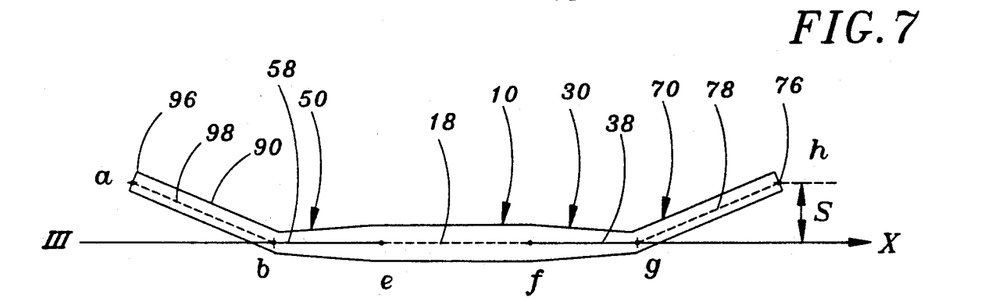
FIG. 7 is an alternative view of the present invention improved hanlebar 2 when it is observed along Plane III, showing again that Sweep S is the distance from the distal end 76 of the first grip section 70 to Plane III.
Figure 8:
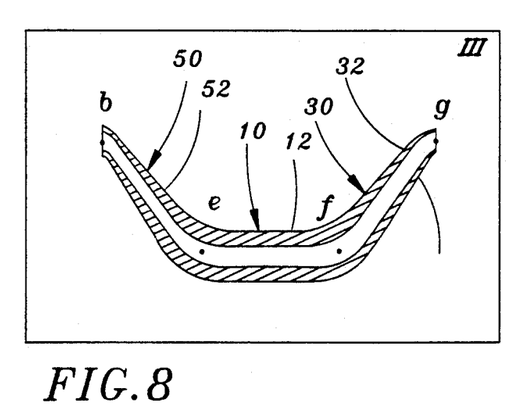
FIG. 8 is a longitudinal cross-sectional view of the center section 10 and the first bent section 30 of the present invention improved handlebar 2 taken along Plane III of FIG. 2.
Figure 9:
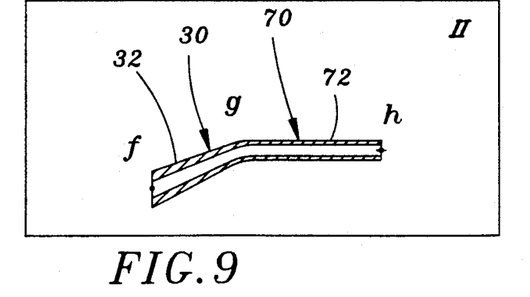
FIG. 9 is a longitudinal cross-sectional view of the first bent section 30 and the first grip section 70 of the present invention handlebar 2 taken along Plane II of FIG. 2.
Figure 10:
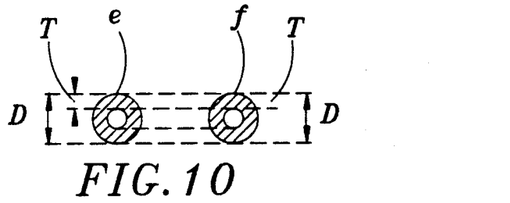
FIG. 10 is a transverse cross-sectional view of the first end 14 and second end 16 of the center section 10 of the present invention improved handlebar 2 taken respectively at joints e and f shown in FIG. 1.
Figure 11:
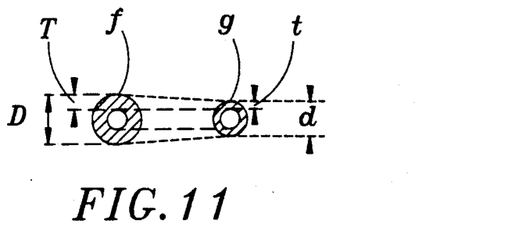
FIG. 11 is a transverse cross-sectional view of the proximal end 34 and distal end 36 of the first bent section 30 of the present invention improved handlebar 2 taken respectively at joints f and g shown in FIG. 1.
Figure 12:
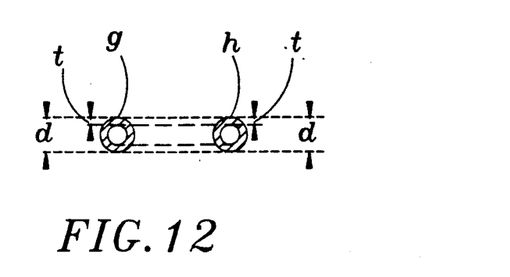
FIG. 12 is a transverse cross-sectional view of the proximal end 74 and distal end 76 of the first grip section 70 of the present invention improved handlebar 2 taken respectively at joints g and h shown in FIG. 1.

An alternative view of the improved handlebar 2 is shown in FIG. 7. It is viewed along plane III, showing again that sweep S is the distance from the distal end 76 of the first grip section 70 to plane III.

The two most unique features of the present invention improved handlebar 2 are illustrated in FIGS. 8 through 12. Shown in FIGS. 8 and 10 through 12, the first most unique feature of the present invention improved handlebar 2 is that the diameter of its center section 10 is uniform and equals to a greatest diameter D, the diameter of its first grip section 70 is also uniform but equals to a smallest diameter d, and the diameter of its first bent section 30 is gradually decreased from the greatest diameter D at the joint f with the center section 10 to the smallest diameter d at the joint g with the first grip section 70.

Shown in FIGS. 9 through 12, the second most unique feature of the present invention improved handlebar 2 is that the thickness of the sidewall 12 of its center section 10 is uniform and equals to a greatest thickness T, the thickness of the sidewall 72 of its first grip section 70 is also uniform but equals to a smallest thickness t, and the thickness of the sidewall 32 of its first bent section 30 is gradually decreased from the greatest thickness T at the joint f with the center section 10 to the smallest thickness t at the joint g with the first grip section 70.

In the preferred embodiments of the present invention handlebar 2, the greatest diameter D is approximately 1⅛ inch, the smallest diameter d is approximately ⅞ inch, the greatest thickness T is approximately 0.150 inch, and the smallest thickness t is approximately 0.110 inch.

The significance of these two unique features of the present invention improved handlebar 2 is that first, the strength of the improved handlebar 2 is reinforced due to the increased diameter and thickened sidewall 32 of the central section 10 upon which the improved handlebar 2 is to be attached to a vehicle, and second, the stiffness of the improved handlebar 2 is reduced due to the decreased diameters and thinned sidewalls 72 and 92 of said first and second grip sections 70 and 90 upon which the improved handlebar 2 is to be gripped by a rider.

As previously discussed, the tubing from which prior art handlebars are made is generally the same diameter throughout. The preferred diameter for conventional tubing for handlebar is approximately ⅞ inch. This tubing of ⅞ inch diameter provides the preferred thickness for overlapping gripping means of approximately ¼ inch thickness since the resultant 1⅛ inch thickness is best suited for gripping by the human hand. However, the present invention has increased the diameter of the central section 10 of the improved handlebars 2 to approximately 1⅛ inch. The strength of a cross-sectional area is increased by increased diameter and surface area. The strength of a cylindrical surface area is directly proportional to the cube of the cross-sectional diameter of the area. Therefore, increasing the diameter from approximately ⅞ inch to approximately 1⅛ inch provides a 29% increase in the diameter which very substantially increases the strength of the hollow tubing of the central section 10. The central section 10 of improved handlebar 2 is clamped to a vehicle at two spaced apart locations 15. The clamping areas 15 are increased by approximately 48% over the clamping areas of prior art handlebars having only ⅞ inch diameter. As a result, the clamping bite of attachment clamps from the vehicle is very substantially increased over the clamping bite on prior art handlebars. Due to the significant increase in strength of the central section 10 of the present invention improved handlebar 2 over the prior art handlebars, the crossbar or brace required for increasing the strength of prior art handlebars, such as the one shown in FIG. 1, is not required and can be entirely eliminated for the present invention handlebars. As an additional result, the stress problems at the crossbar intersections as previously described are also entirely eliminated.

Another one of the significant features of the present invention is to produce the improved handlebars 2 from a single length of hollow tubing which is manufactured by a specialized process that enables a portion of the tubing to have an enlarged diameter and thickened sidewall while the remainder of the tubing is gradually tapered to the smallest diameter and thinned sidewall. Therefore the hollow tubular body of handlebar 2 is manufactured so that the central section 10 has the largest diameter of approximately 1⅛ inch and thickest sidewall of approximately 0.150 inch, while the first and second bent sections 30 and 50 are tapered so that the first and second grip sections 70 and 90 have the smallest diameter of approximately ⅞ inch and thinnest sidewalls of approximately 0.110 inch.

The result of the improved design is that the improved handlebar 2 have substantially increased horizontal strength due to its larger diameter at its central section 10. The elimination of the crossbar or brace gives the improved handlebar 2 reduced weight and vertical stiffness. The overall tapering design from the larger diameter of 1⅛ inch to the normal diameter of ⅞ inch not only reduces the overall weight of the improved handlebar 2 but also enables the improved handlebar 2 to absorb more impact energy and thus transmit less shock to the rider's hands than prior art designs. In addition, the crossbar or brace of prior art designs transmits shock and vibration between the two opposite sides of a handlebar. The elimination of the crossbar or brace permits each side to function independently.

In addition, the tapering of the improved handlebar 2 allows for greater unsupported strength through the use of a large diameter at the points of high stress which is the location where the handlebars are attached to the vehicle. By tapering the handlebars, the length of unsupported span is significantly increased. The unsupported span of prior art handlebar 1 is illustrated by dimension U in FIG. 1. The unsupported span of present invention improved handlebar 2 is illustrated by dimension V in FIG. 2. The improvement is a greater radius of span to distribute load, strain and impact more evenly, and substantially reduces the shock to the rider. It further provides added torsional control and positive steering feel to the rider. The tapering of bent sections 50 and 70 of the present invention handlebar 2 further causes them to bend comparable to a flag pole or aircraft wing assembly, thereby distributing the load more evenly and substantially reducing shock to the rider.

The preferred material for the improved handlebars is a high strength aluminum alloy. The improved handlebars can also be made out of aluminum, steel, titanium, or a composite of these metals.

Actual testing of the present invention improved handlebar compared to prior art handlebars confirmed the previously discussed advantages of the present invention. To measure the amount of shock that reaches the rider's hands, each handlebar was clamped and a guided 8.6 pound weight was dropped from a height of 12 inches onto the end of the handlebar. A ¼ inch urethane pad was used to simulate the grip. An accelerometer was placed under the impact area recorded shock levels, which were read into a computer and stored. The data showed that two respective prior art handlebars registered similar shock loads of 289 G's and 272 G's respectively, whereas the present invention improved handlebar registered only 213 G's or 22%-26% less.

Static deflection tests were also performed to measure the comparative stiffness of prior art handlebars and the present invention improved handlebar. Loads were applied through a hydraulic cylinder, and deflection was measured with a dial indicator. Due to the lack of the crossbar, the present invention improved handlebar was 43% less stiff in the vertical direction than prior art handlebars with a crossbar. The present invention improved handlebar was also 33% stronger in the horizontal direction due to the increased torsional strength of the larger diameter.

An impact test was run to determine the crash resistance of the present invention improved handlebar compared to prior art handlebars. A guided 25 pound weight was dropped from a height of 4 feet onto the end of each handlebar in both the vertical and horizontal planes while clamped in standard motorcycle clamps. All handlebars were measured before and after drop testing and the amount of permanent set was documented. In the vertical direction, the present invention improved handlebar exhibited only 34% of the total deformation present in the prior art handlebars. In the horizontal direction, the present invention improved handlebar exhibited only 30% of the prior art handlebar's deformation.

The actual embodiments of the present invention improved handlebar have also been tested in many mountain bike or all terrain bike races. Users of these actual embodiments of the present invention improved handlebar highly praised the superior performance of the present invention improved handlebar over prior art handlebars.

Defined in detail, the present invention is an improved handlebar for bicycles, motorcycles, power vehicles such as two wheeled power vehicles and all terrain vehicles including off road bicycles and motorcycles, dirt bikes, all terrain bicycles, all terrain vehicles and jet skis, comprising: (a) an integrally formed unitary hollow tubular member having a straight center section, a first and a second bent sections, and a first and a second straight grip sections, where the second bent section is a mirror-image of the first bent section, and the second grip section is a mirror-image of the first grip section; (b) said center section having a principal axis, a cylindrical hollow sidewall and a first and a second ends; (c) said first and second bent sections each having a principal axis, a tapered hollow sidewall and a proximal and a distal ends, the proximal end of said first bent section joining said first end of said center section, and the proximal end of said second bent section joining said second end of said center section; (d) said first and second grip sections each having a principal axis, a cylindrical hollow sidewall and a proximal and a distal ends, the proximal end of said first grip section joining said distal end of said first bent section, and the proximal end of said second grip section joining said distal end of said second grip section; (e) said axes of said first and second grip sections defining a first plane; (f) said axes of said first bent section and said first grip section defining a second plane; (g) said axes of said center section and said first and second bent section defining a third plane; (h) said axis of said central section being parallel to but not coincident with said first plane; (i) the angle between said axes of said center section and said first bent section being between approximately twenty-two degrees and approximately seventy degrees; (j) the angle between said axis of said center section and said second plane being between approximately ten degrees and approximately twenty-five degrees; (k) the angle between said axes of said first bent section and said first grip section being between approximately seven degrees and approximately eighty degrees; (l) the distance between said distal ends of said first and second grip sections defining a width of the handlebar; (m) the distance between said first and second ends of said center section defining a middle width of the handlebar; (n) the distance from said distal end of said first grip section to said third plane defining a sweep of the handlebar; (o) the distance between said axis of said center section and said first plane defining a raise of the handlebar; (p) the diameter of said center section being uniform and greatest, the diameters of said first and second grip sections being uniform and smallest, and the diameters of said first and second bent sections being gradually decreased from greatest at their respective proximal ends to smallest at their respective distal ends; and (q) the thickness of said sidewall of said center section being uniform and greatest, the thickness of said sidewall of said first and second grip sections being uniform and smallest, and the respective thickness of said sidewalls of said first and second bent sections being gradually decreased from greatest at their respective proximal ends to smallest at their respective distal ends; (r) whereby the strength of the handlebar is reinforced due to the increased diameter and thickened sidewall of said central section, and the stiffness of said handlebar is reduced due to the decreased diameters and thinned sidewalls of said first and second grip sections.

In one of the preferred embodiments of the present invention defined in detail: (a) the integrally formed unitary hollow tubular member is made of metal materials including aluminum and titanium; (b) said width of the handlebar is approximately 32 inches; (c) said middle width of the handlebar is approximately 7¼ inches; (d) said sweep of the handlebar is between approximately 3⅛ inches and approximately 3⅝ inches; (e) said raise of the handlebar is between approximately 2⅞ inches and approximately 3⅜ inches; (f) said greatest diameter is approximately 1¼ inch, and said smallest diameter is approximately ⅞ inch; and (g) said greatest thickness is approximately 0.200 inch, and said smallest thickness is approximately 0.030 inch.

Defined broadly, the present invention is an improved handlebar for bicycles, motorcycles, power vehicles such as two wheeled power vehicles and all terrain vehicles including off road bicycles and motorcycles, dirt bikes, all terrain bicycles, all terrain vehicles and jet skis, comprising: (a) an elongated unitary hollow member having a substantially straight center section, a first and a second bent sections, and a first and a second substantially straight grip sections, where the second bent section is a mirror-image of the first bent section, and the second grip section is a mirror-image of the first grip section; (b) said center section having a principal axis, a hollow sidewall and a first and a second ends; (c) said first and second bent sections each having a principal axis, a tapered hollow sidewall and a proximal and a distal ends, the proximal end of said first bent section joining said first end of said center section, and the proximal end of said second bent section joining said second end of said center section; (d) said first and second grip sections each having a principal axis, a hollow sidewall and a proximal and a distal ends, the proximal end of said first grip section joining said distal end of said first bent section, and the proximal end of said second grip section joining said distal end of said second grip section; (e) said axis of said central section being parallel to but not coincident with a plane defined by said axes of said first and second grip sections; (f) the diameter of said center section being greatest, the diameters of said first and second grip sections being smallest, and the respective diameters of said first and second bent sections being gradually changed from the diameter of said center section to the respective diameters of said first and second grip sections; and (g) the thickness of said sidewall of said center section being greatest, the thickness of said sidewall of said first and second grip sections being smallest, and the respective thickness of said sidewalls of said first and second bent sections being gradually changed from the thickness of said sidewall of said center section to the respective thickness of said sidewalls of said first and second grip sections; (h) whereby the strength of the handlebar is reinforced due to the increased diameter and thickened sidewall of said central section, and the stiffness of said handlebar is reduced due to the decreased diameters and thinned sidewalls of said first and second grip sections.

Defined more broadly, the present invention is an improved handlebar for bicycles, motorcycles, power vehicles such as two wheeled power vehicles and all terrain vehicles including off road bicycles and motorcycles, dirt bikes, all terrain bicycles, all terrain vehicles and jet skis, comprising: (a) an elongated member having a generally straight center section, a first and a second bent sections, and a first and a second generally straight grip sections, where the second bent section is a mirror-image of the first bent section, and the second grip section is a mirror-image of the first grip section; (b) said center section having a hollow sidewall and a first and a second ends; (c) said first and second bent sections each having a tapered hollow sidewall and a proximal and a distal ends, the proximal end of said first bent section joining said first end of said center section, and the proximal end of said second bent section joining said second end of said center section; (d) said first and second grip sections each having a hollow sidewall and a proximal and a distal ends, the proximal end of said first grip section joining said distal end of said first bent section, and the proximal end of said second grip section joining said distal end of said second grip section; (e) the circumferential dimension of said center section being generally greater than the circumferential dimensions of said first and second grip sections, and the circumferential dimensions of said first and second bent sections being gradually changed from the circumferential dimension of said center section to the respective circumferential dimensions of said first and second grip sections; and (f) the thickness of said sidewall of said center section being generally greater than the respective thickness of said sidewalls of said first and second grip sections, and the respective thickness of said sidewalls of said first and second bent sections being gradually changed from the thickness of said sidewall of said center section to the respective thickness of said sidewalls of said first and second grip sections; (g) whereby the strength of the handlebar is reinforced due to the increased diameter and thickened sidewall of said central section, and the stiffness of said handlebar is reduced due to the decreased diameters and thinned sidewalls of said first and second grip sections.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An improved handlebar for bicycles, motorcycles, power vehicles such as two wheeled power vehicles and all terrain vehicles including off road bicycles and motorcycles, dirt bikes, all terrain bicycles, all terrain vehicles and jet skis, comprising:
    a. an integrally formed unitary hollow tubular member having a straight center section, a first and a second bent sections, and a first and a second straight grip sections, where the second bent section is a mirror-image of the first bent section, and the second grip section is a mirror-image of the first grip section;
    b. said center section having a principal axis, a cylindrical hollow sidewall and a first and a second ends;
    c. said first and second bent sections each having a principal axis, a tapered hollow sidewall and a proximal and a distal ends, the proximal end of said first bent section joining said first end of said center section, and the proximal end of said second bent section joining said second end of said center section;
    d. said first and second grip sections each having a principal axis, a cylindrical hollow sidewall and a proximal and a distal ends, the proximal end of said first grip section joining said distal end of said first bent section, and the proximal end of said second grip section joining said distal end of said second grip section;
    e. said axes of said first and second grip sections defining a first plane;
    f. said axes of said first bent section and said first grip section defining a second plane;
    g. said axes of said center section and said first and second bent section defining a third plane;
    h. said axis of said central section being parallel to but not coincident with said first plane;
    i. the angle between said axes of said center section and said first bent section being between approximately twenty-two degrees and approximately seventy degree;
    j. the angle between said axis of said center section and said second plane being between approximately ten degrees and approximately twenty-five degrees;
    k. the angle between said axes of said first bent section and said first grip section being between approximately seven degrees and approximately eighty degrees;
    l. the distance between said distal ends of said first and second grip sections defining a width of the handlebar;
    m. the distance between said first and second ends of said center section defining a middle width of the handlebar;
    n. the distance from said distal end of said first grip section to said third plane defining a sweep of the handlebar;
    o. the distance between said axis of said center section and said first plane defining a raise of the handlebar;
    p. the diameter of said center section being uniform and greatest, the diameters of said first and second grip sections being uniform and smallest, and the diameters of said first and second bent sections being gradually decreased from greatest at their respective proximal ends to smallest at their respective distal ends; and
    q. the thickness of said sidewall of said center section being uniform and greatest, the thickness of said sidewall of said first and second grip sections being uniform and smallest, and the respective thickness of said sidewalls of said first and second bent sections being gradually decreased from greatest at their respective proximal ends to smallest at their respective distal ends;

r. whereby the strength of the handlebar is reinforced due to the increased diameter and thickened sidewall of said central section, and the stiffness of said handlebar is reduced due to the decreased diameters and thinned sidewalls of said first and second grip sections.

2. Improved handlebar in accordance with claim 1 wherein said integrally formed unitary hollow tubular member is made of metal materials including aluminum and titanium.

3. Improved handlebar in accordance with claim 1 wherein said width of the handlebar is approximately 32 inches.

4. Improved handlebar in accordance with claim 1 wherein said middle width of the handlebar is approximately 7¼ inches.

5. Improved handlebar in accordance with claim 1 wherein said sweep of the handlebar is between approximately 3⅛ inches and approximately 3⅝ inches.

6. Improved handlebar in accordance with claim 1 wherein said raise of the handlebar is between approximately 2⅞ inches and approximately 3⅜ inches.

7. Improved handlebar in accordance with claim 1 wherein said greatest diameter is approximately 1¼ inch, and said smallest diameter is approximately ⅞ inch.

8. Improved handlebar in accordance with claim 1 wherein said greatest thickness is approximately 0.200 inch, and said smallest thickness is approximately 0.030 inch.

9. An improved handlebar for bicycles, motorcycles, power vehicles such as two wheeled power vehicles and all terrain vehicles including off road bicycles and motorcycles, dirt bikes, all terrain bicycles, all terrain vehicles and jet skis, comprising:

a. an elongated unitary hollow member having a substantially straight center section, a first and a second bent sections, and a first and a second substantially straight grip sections, where the second bent section is a mirror-image of the first bent section, and the second grip section is a mirror-image of the first grip section;

b. said center section having a principal axis, a hollow sidewall and a first and a second ends;

c. said first and second bent sections each having a principal axis, a tapered hollow sidewall and a proximal and a distal ends, the proximal end of said first bent section joining said first end of said center section, and the proximal end of said second bent section joining said second end of said center section;

d. said first and second grip sections each having a principal axis, a hollow sidewall and a proximal and a distal ends, the proximal end of said first grip section joining said distal end of said first bent section, and the proximal end of said second grip section joining said distal end of said second bent section;

e. said axis of said central section being parallel to but not coincident with a plane defined by said axes of said first and second grip sections;

f. the diameter of said center section being greatest, the diameters of said first and second grip sections being smallest, and the respective diameters of said first and second bent sections being gradually changed from the diameter of said center section to the respective diameters of said first and second grip sections; and g. the thickness of said sidewall of said center section being greatest, the thickness of said sidewall of said first and second grip sections being smallest, and the respective thickness of said sidewalls of said first and second bent sections being gradually changed from the thickness of said sidewall of said center section to the respective thickness of said sidewalls of said first and second grip sections;

h. whereby the strength of the handlebar is reinforced due to the increased diameter and thickened sidewall of said central section, and the stiffness of said handlebar is reduced due to the decreased diameters and thinned sidewalls of said first and second grip sections.

10. Improved handlebar in accordance with claim 9 wherein said elongated unitary hollow member is made of metal materials including aluminum and titanium.

11. Improved handlebar in accordance with claim 9 wherein the angle between said axes of said center section and said first bent section being between approximately twenty-two degrees and approximately seventy degrees.

12. Improved handlebar in accordance with claim 9 wherein the angle between said axis of said center section and a plane defined by said axes of said first bent section and said first grip section is between approximately ten degrees and approximately twenty-five degrees.

13. Improved handlebar in accordance with claim 9 wherein the angle between said axes of said first bent section and said first grip section being between approximately seven degrees and approximately eighty degrees.

14. Improved handlebar in accordance with claim 9 wherein a width of the handlebar, which is the distance between said distal ends of said first and second grip sections, is approximately 32 inches.

15. Improved handlebar in accordance with claim 9 wherein a middle width of the handlebar, which is the distance between said first and second ends of said center section, is approximately 7¼ inches.

16. Improved handlebar in accordance with claim 9 wherein a sweep of the handlebar, which is the distance from said distal end of said first grip section to a plane, which is defined by said axes of said center section and said first and second bent section, is between approximately 3⅛ inches and approximately 3⅝ inches.

17. Improved handlebar in accordance with claim 9 wherein a raise of the handlebar, which is the distance between said axis of said center section and said plane defined by said axes of said first and second grip sections, is between approximately 2⅞ inches and approximately 3⅜ inches.

18. Improved handlebar in accordance with claim 9 wherein said greatest diameter is approximately 1⅛ inch, and said smallest diameter is approximately ⅞ inch.

19. Improved handlebar in accordance with claim 9 wherein said greatest thickness is approximately 0.200 inch, and said smallest thickness is approximately 0.030 inch.

20. An improved handlebar for bicycles, motorcycles, power vehicles such as two wheeled power vehicles and all terrain vehicles including off road bicycles and motorcycles, dirt bikes, all terrain bicycles, all terrain vehicles and jet skis, comprising:

a. an elongated member having a generally straight center section, a first and a second bent section, and a first and a second generally straight grip sections, where the second bent section is a mirror-image of the first bent section, and the second grip section is a mirror-image of the first grip section;

b. said center section having a hollow sidewall and a first and a second ends;

c. said first and second bent sections each having a tapered hollow sidewall and a proximal and a distal ends, the proximal end of said first bent section joining said first end of said center section, and the proximal end of said second bent section joining said second end of said center section;

d. said first and second grip sections each having a hollow sidewall and a proximal and a distal ends, the proximal end of said first grip section joining said distal end of said first bent section, and the proximal end of said second grip section joining said distal end of said second bent section;

e. the circumferential dimension of said center section being generally greater than the circumferential dimensions of said first and second grip sections, and the circumferential dimensions of said first and second bent sections being gradually changed from the circumferential dimension of said center section to the respective circumferential dimensions of said first and second grip sections; and f. the thickness of said sidewall of said center section being generally greater than the respective thickness of said sidewalls of said first and second grip sections, and the respective thickness of said sidewalls of said first and second bent sections being gradually changed from the thickness of said sidewall of said center section to the respective thickness of said sidewalls of said first and second grip sections;

g. whereby the strength of the handlebar is reinforced due to the increased diameter and thickened sidewall of said central section, and the stiffness of said handlebar is reduced due to the decreased diameters and thinned sidewalls of said first and second grip sections.

21. Improved handlebar in accordance with claim 20 wherein said elongated member is made of metal materials including aluminum and titanium.

22. Improved handlebar in accordance with claim 20 wherein an axis of said central section is parallel to but not coincident with a plane defined by an axis of said first grip section and an axis of said second grip section.

23. Improved handlebar in accordance with claim 20 wherein said center section has a greatest circumferential dimension of approximately 1¼ inch in diameter, and said first and second grip sections have a smallest circumferential dimension of approximately ⅞ inch in diameter.

24. Improved handlebar in accordance with claim 20 wherein said center section has a thickest sidewall of approximately 0.200 inch in thickness, and said first and second grip sections have a thinnest sidewall of approximately 0.030 inch in thickness.

* * * * *

UNITED STATES PATENT AND TRADEMARK OFFICE
CERTIFICATE OF CORRECTION

| | | |
|---|---|---|
| PATENT NO. | : 5,257,552 | Page 1 of 1 |
| APPLICATION NO. | : 07/833125 | |
| DATED | : November 2, 1993 | |
| INVENTOR(S) | : Scott M. Boyer et al. | |

It is certified that error appears in the above-identified patent and that said Letters Patent is hereby corrected as shown below:

On Title Page, the Notice, at line 2, "June 2, 2009" should be changed to --February 19, 2011--.

Signed and Sealed this

Sixth Day of February, 2007

JON W. DUDAS
*Director of the United States Patent and Trademark Office*